United States Patent
Kim et al.

(10) Patent No.: US 11,275,986 B2
(45) Date of Patent: Mar. 15, 2022

(54) METHOD AND APPARATUS FOR QUANTIZING ARTIFICIAL NEURAL NETWORK

(71) Applicant: SAMSUNG ELECTRONICS CO., LTD., Suwon-si (KR)

(72) Inventors: Do-yun Kim, Gwacheon-si (KR);
Han-young Yim, Suwon-si (KR);
In-yup Kang, San Diego, CA (US);
Byeoung-su Kim, Hwaseong-si (KR);
Nak-woo Sung, Yongin-si (KR);
Jong-Han Lim, Seoul (KR);
Sang-hyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 945 days.

(21) Appl. No.: 16/008,275

(22) Filed: Jun. 14, 2018

(65) Prior Publication Data
US 2019/0095777 A1 Mar. 28, 2019

(30) Foreign Application Priority Data
Sep. 25, 2017 (KR) .................. 10-2017-0123658

(51) Int. Cl.
*G06N 3/04* (2006.01)
*G06N 3/063* (2006.01)
*G06N 3/08* (2006.01)

(52) U.S. Cl.
CPC .............. *G06N 3/04* (2013.01); *G06N 3/063* (2013.01); *G06N 3/08* (2013.01)

(58) Field of Classification Search
CPC ............ G06N 3/04; G06N 3/063; G06N 3/08; G06N 3/0454; G06N 3/049
See application file for complete search history.

(56) References Cited

U.S. PATENT DOCUMENTS

| 7,293,001 | B1 | 11/2007 | Rai |
| 8,346,692 | B2 | 1/2013 | Rouat et al. |
| 9,092,726 | B2 | 7/2015 | Esterline |
| 9,503,855 | B2 | 11/2016 | Chen |
| 9,620,426 | B2 | 4/2017 | Izikson et al. |
| 9,916,531 | B1 * | 3/2018 | Zivkovic .................. G06N 3/08 |
| 2014/0221234 | A1 | 8/2014 | Khan et al. |

(Continued)

OTHER PUBLICATIONS

Hwang et al., "Fixed-Point Feedforward Deep Neural Network Design Using Weights +1, 0, and −1", 2014, 2014 IEEE Workshop on Signal Processing Systems (SiPS), pp. 1-6. (Year: 2014).*

(Continued)

*Primary Examiner* — Kamran Afshar
*Assistant Examiner* — Ying Yu Chen
(74) *Attorney, Agent, or Firm* — Sughrue Mion, PLLC

(57) ABSTRACT

A method of quantizing an artificial neural network includes dividing an input distribution of the artificial neural network into a plurality of segments, generating an approximated density function by approximating each of the plurality of segments, calculating at least one quantization error corresponding to at least one step size for quantizing the artificial neural network, based on the approximated density function, and determining a final step size for quantizing the artificial neural network based on the at least one quantization error.

20 Claims, 10 Drawing Sheets

(56) References Cited

U.S. PATENT DOCUMENTS

| | | | |
|---|---|---|---|
| 2014/0310216 A1* | 10/2014 | Sarah | G06N 3/049 706/15 |
| 2015/0100244 A1 | 4/2015 | Hannum | |
| 2016/0275947 A1 | 9/2016 | Li et al. | |
| 2016/0328646 A1 | 11/2016 | Lin et al. | |
| 2016/0328647 A1 | 11/2016 | Lin et al. | |
| 2018/0046896 A1* | 2/2018 | Yu | G06N 3/0454 |
| 2018/0350109 A1* | 12/2018 | Pan | H04N 19/172 |

OTHER PUBLICATIONS

Qiu et al., "Deep Quantization: Encoding Convolutional Activations with Deep Generative Model", Jul. 2017, 2017 IEEE Conference on Computer Vision and Pattern Recognition (CVPR), pp. 4085-4094. (Year: 2017).*

Zhou et al., "Balanced Quantization: An Effective and Efficient Approach to Quantized Neural Networks", Jul. 2017, Journal of Computer Science and Technology 32(4), pp. 667-682. (Year: 2017).*

Lin et al., "Fixed Point Quantization of Deep Convolutional Networks", 2016, Proceedings of the 33rd International Conference on Machine Learning, pp. 1-10. (Year: 2016).*

Cai et al., "Deep Learning with Low Precision by Half-wave Gaussian Quantization", Feb. 3, 2017, arXiv, pp. 1-10. (Year: 2017).*

Han et al., "Deep Compression: Compressing Deep Neural Networks With Pruning, Trained Quantization and Huffman Coding", Feb. 15, 2016, arXiv, pp. 1-14. (Year: 2016).*

* cited by examiner

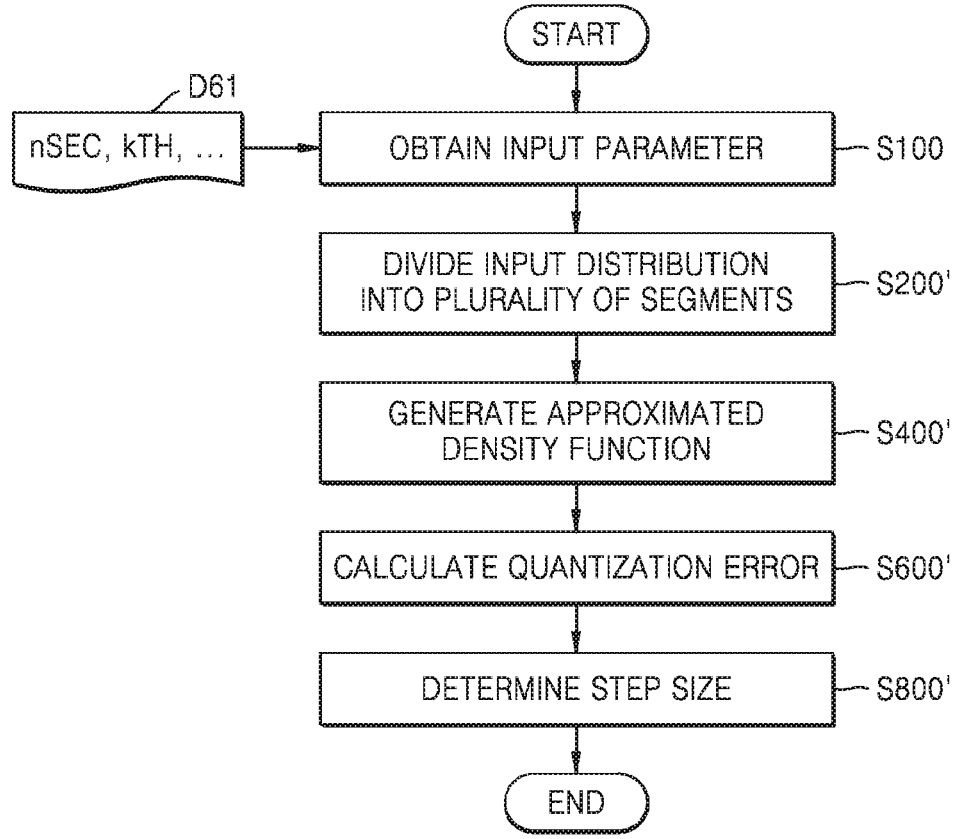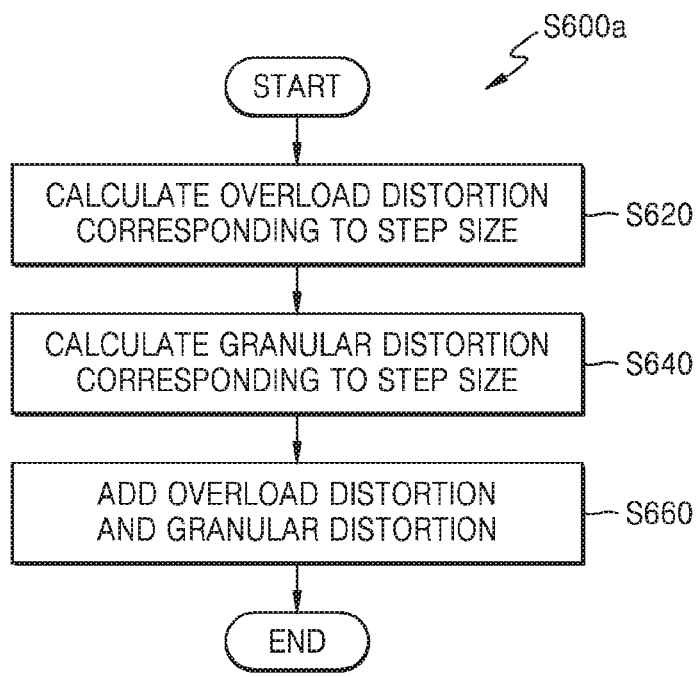

METHOD AND APPARATUS FOR QUANTIZING ARTIFICIAL NEURAL NETWORK

CROSS-REFERENCE TO RELATED APPLICATION

This application claims priority from Korean Patent Application No. 10-2017-0123658, filed on Sep. 25, 2017, in the Korean Intellectual Property Office, the disclosure of which is incorporated herein in its entirety by reference.

BACKGROUND

Apparatuses and methods consistent with example embodiments relate to an artificial neural network, and more particularly, to quantizing an artificial neural network.

An artificial neural network may refer to a method performed by a computing device or a computing device to generate interconnected sets of artificial neurons (or neuron models). Artificial neurons may generate output data by performing simple operations on input data, and the output data may be transmitted to other artificial neurons. As an example of an artificial neural network, a deep neural network or deep learning architecture may have a multi-layer structure and multiple sample distributions may be generated by training each of the layers according to multiple samples.

SUMMARY

One or more example embodiments provide a method of quantizing an artificial neural network, the method simultaneously providing high accuracy and low computational complexity in an artificial neural network.

One or more example embodiments also provide an apparatus for quantizing an artificial neural network, the apparatus simultaneously providing high accuracy and low computational complexity in an artificial neural network.

According to an aspect of an example embodiment, there is provided a method of quantizing an artificial neural network, the method including: dividing an input distribution of the artificial neural network into a plurality of segments; generating an approximated density function by approximating each of the plurality of segments; calculating at least one quantization error corresponding to at least one step size for quantizing the artificial neural network, based on the approximated density function; and determining a final step size for quantizing the artificial neural network, based on the at least one quantization error.

According to an aspect of another example embodiment, there is provided an apparatus including: a memory; and at least one processor configured to execute computer-executable procedures stored in the memory, wherein the computer-executable procedures include: an approximator configured to generate an approximated density function by approximating each of a plurality of segments divided from an input distribution of an artificial neural network; and a quantizer configured to calculate at least one quantization error corresponding to at least one step size for quantizing the artificial neural network based on the approximated density function and to determine a final step size for quantizing the artificial neural network according to the at least one quantization error.

According to an aspect of another example embodiment, there is provided a method of quantizing a floating-point neural network, the method including: dividing an input distribution of the floating-point neural network into a plurality of segments having a uniform width; generating an approximated density function by approximating each of the plurality of segments to a polynomial; calculating at least one quantization error corresponding to at least one fractional length, based on the approximated density function; and determining a final step size for quantizing the floating-point neural network, based on the at least one quantization error.

BRIEF DESCRIPTION OF THE DRAWINGS

The above and/or other aspects will be more clearly understood from the following detailed description taken in conjunction with the accompanying drawings in which:

FIG. 6 is a flowchart illustrating a method of quantizing an artificial neural network, according to an example embodiment;

FIG. 7 is a flowchart illustrating an example of operation S600 of FIG. 3, according to an example embodiment;

DETAILED DESCRIPTION

Figure 1:
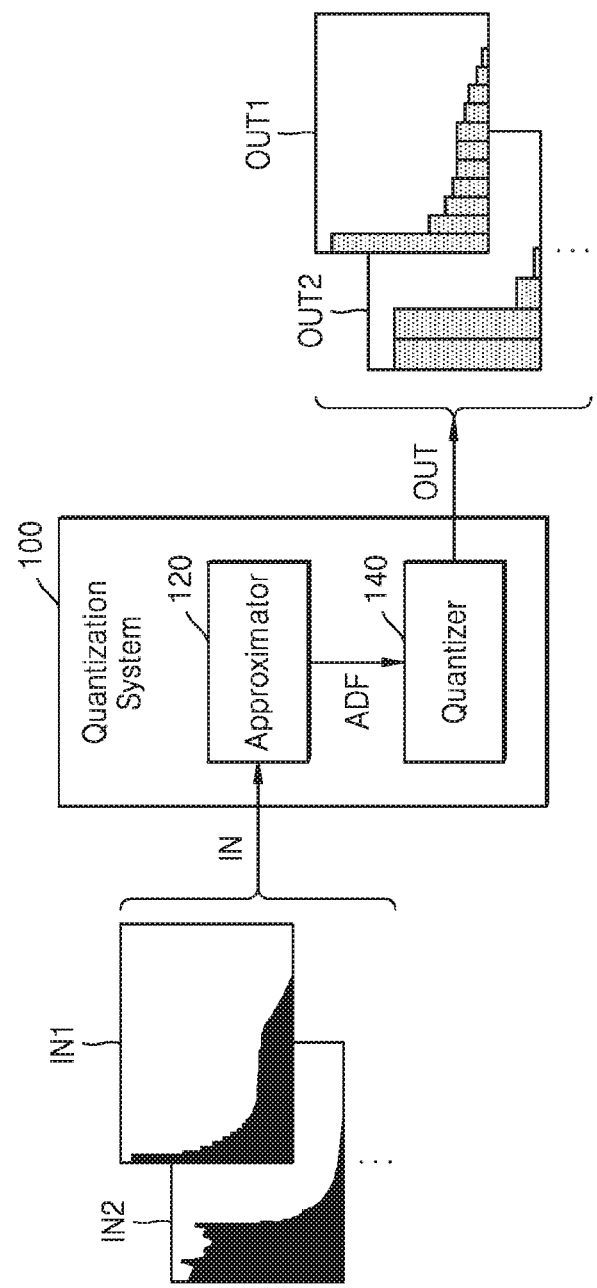
FIG. 1 is a block diagram illustrating a quantization system according to an example embodiment.

Reference will now be made in detail to example embodiments, with reference to the accompanying drawings. In the drawings, parts irrelevant to the description are omitted to clearly describe the exemplary embodiments, and like reference numerals refer to like elements throughout the specification. In this regard, the present example embodiments may have different forms and should not be construed as being limited to the descriptions set forth herein.

FIG. 1 is a block diagram illustrating a quantization system 100 according to an example embodiment. An artificial neural network may refer to a computing system inspired from a biological neural network that forms an animal's brain. The artificial neural network may learn to perform tasks by considering multiple samples (or examples), unlike conventional non-neural-network-based algorithms that perform tasks according to predefined conditions, such as rule-based programming. The artificial neural network may have a structure in which artificial neurons (or neurons) are connected to one another, and a connection between the neurons may be referred to as a synapse. Each of the neurons may process a received signal and transmit a processed signal to another neuron through a synapse. The output of the neuron may be referred to as "activation". The neuron and/or the synapse may have varying weights, and the influence of a signal processed by the neuron may increase or decrease depending on its weight. In particular, the weight associated with an individual neuron may be referred to as a bias.

A deep neural network or deep learning architecture may have a layer structure, and an output of a particular layer may be an input of a subsequent layer. In such a multi-layered structure, each of the layers may be trained according to multiple samples. An artificial neural network, such as the deep neural network, may be implemented by a plurality of processing nodes, each corresponding to an artificial neuron, and may require high computational complexity to obtain good results, for example, high accuracy results, and thus a large number of computing resources may be required.

To reduce computational complexity, an artificial neural network may be quantized. Quantization may refer to a process of mapping input values to a smaller number of values than the number of input values, like mapping a real number to an integer through rounding. In an artificial neural network, quantization may involve a process of converting a floating-point neural network into a fixed-point neural network. For example, in an artificial neural network, quantization may be applied to layer activations, weights, biases, and so on. Floating-point numbers may include signs, exponents, and significant digits (or significands), whereas fixed-point numbers may include integer parts and fraction parts. In some examples, the integer parts of the fixed-point numbers may include sign bits. An artificial neural network using floating-point numbers, i.e., a floating-point neural network, may have higher accuracy and computational complexity, whereas an artificial neural network using fixed-point numbers, i.e., a fixed-point neural network, may have more reduced accuracy and computational complexity.

Due to a trade-off relationship between accuracy of results and computational complexity in the artificial neural network, quantization of the artificial neural network may result in a decrease in accuracy, and the level of decrease in accuracy may depend on the type of quantization method. As described below with reference to drawings, the quantization system 100 according to the example embodiment may provide quantization according to requirements while minimizing a decrease in accuracy, and accordingly, a fixed-point neural network having good performance and reduced complexity may be provided.

The quantization system 100 may be any system that performs quantization according to example embodiments, and may be referred to as a quantization apparatus. For example, the quantization system 100 may be a computing system that includes at least one processor and a memory. As a non-limiting example, the quantization system 100 may be a mobile computing system, such as a laptop computer and a smartphone, as well as a stationary computing system, such as a desktop computer and a server. As shown in FIG. 1, the quantization system 100 may include an approximator 120 and a quantizer 140, and each of the approximator 120 and the quantizer 140 may be implemented with a logic block implemented through logic synthesis, a software block performed by a processor, or a combination thereof. In some embodiments, each of the approximator 120 and the quantizer 140 may be a procedure as a set of instructions that are executed by a processor, and may be stored in a memory (e.g., volatile memory or non-volatile memory) accessible by the processor.

Referring to FIG. 1, the quantization system 100 may receive an input distribution IN and may generate a quantized output OUT. The input distribution IN may include a plurality of input distributions IN1 and IN2 such as a distribution of activation values and a distribution of weights, and the quantized output OUT may include quantized data OUT1 and OUT2 that respectively correspond to the input distributions IN1 and IN2. As shown in FIG. 1, the input distributions IN1 and IN2 may have a different form than well-known distributions, such as a Gaussian distribution, a Laplacian distribution, and a Gamma distribution. Therefore, performing quantization on the input distributions IN1 and IN2 having irregular forms, based on the well-known distributions, may be limited and may not provide high accuracy. As described below, the quantization system 100 according to the example embodiment may not be limited to the form of the input distribution IN and may provide quantization having improved accuracy with respect to an input distribution IN having an arbitrary form.

The approximator 120 may receive the input distribution IN, and may generate an approximated density function ADF and provide the generated approximated density function ADF to the quantizer 140. In some embodiments, the approximator 120 may divide the input distribution IN into a plurality of segments and may generate the approximated density function ADF by approximating each of the plurality of segments independently of one another. For example, the approximator 120 may uniformly divide the input distribution IN into a plurality of segments having the same width, derive functions corresponding to each of the plurality of segments by approximating each of the plurality of segments, and generate an approximated density function ADF by combining the derived functions. Accordingly, an approximated density function ADF having a low error, which corresponds to an input distribution IN having an arbitrary form, may be generated, and an optimum step size may be derived based on the approximated density function ADF, as described below. The term "error" as denoted herein with regard to quantization refers to the difference between an input value and its quantized value. An example of the approximator 120 will be described later with reference to FIG. 4 and the like.

The quantizer 140 may receive the approximated density function ADF from the approximator 120 and may generate the quantized output OUT by quantizing the approximated density function ADF. The quantizer 140 may calculate a quantization error corresponding to a step size based on the approximated density function ADF and may determine a final step size based on the quantization error. In some embodiments, the quantizer 140 may calculate a plurality of quantization errors corresponding to a plurality of different quantization steps and may determine a quantization step, which corresponds to a minimum quantization error of the plurality of quantization errors, as a final quantization step. Additionally, the quantizer 140 may quantize the input distribution IN based on the final quantization step and may generate the quantized output OUT. As described above, the quantized output OUT may be used to implement a fixed-point neural network and may provide reduced computational complexity for an artificial neural network while minimizing the degradation of accuracy compared to a floating-point neural network.

Figure 2:
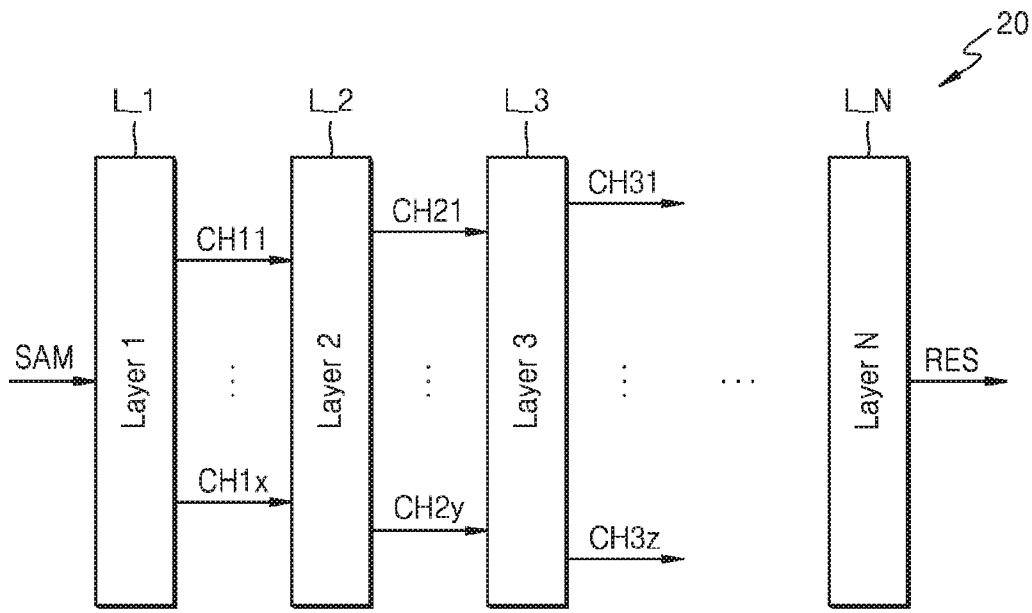
FIG. 2 is a diagram illustrating an example of an artificial neural network according to an example embodiment.

FIG. 2 is a diagram illustrating an example of an artificial neural network according to an example embodiment. Specifically, FIG. 2 is a diagram schematically illustrating the structure of a deep neural network 20 as an example of an artificial neural network.

As shown in FIG. 2, the deep neural network 20 may include a plurality of layers, i.e., first to N-th layers L_1, L_2, L_3, . . . , and L_N, and outputs of each of the first to N-th layers L_1, L_2, L_3, . . . , and L_N may be input to a subsequent layer through at least one channel. For example, the first layer L_1 may provide outputs to the second layer L_2 through a plurality of channels CH11 to CH1$x$ by processing a sample SAM, and the second layer L_2 may also provide outputs to the third layer L_3 through a plurality of channels CH21 to CH2$y$. Finally, the Nth layer L_N may output a result RES, and the result RES may include at least one value associated with the sample SAM. Numbers of channels through which the outputs of the first to N-th layers L_1, L_2, L_3, . . . , and L_N are respectively delivered may be equal to or different from one another. For example, a number of channels CH21 to CH2$y$ of the second layer L_2 and a number of channels CH31 to CH3$z$ of the third layer L_3 may be equal to or different from each other.

The sample SAM may be input data to be processed by the deep neural network 20. For example, the sample SAM may be an image including a letter written by a person with a pen, and the deep neural network 20 may output the result RES containing a value representing the letter by recognizing the letter from the image. The result RES may include a plurality of probabilities corresponding to different letters (i.e., candidates), and the most likely letter among the different letters may correspond to the highest probability. Each of the first to N-th layers L_1, L_2, L_3, . . . , and L_N of the deep neural network 20 may generate its own outputs by processing the sample SAM or outputs of a previous layer based on values (e.g., weights, bias, etc.) generated by learning a plurality of images that include letters.

A method and apparatus (e.g., the quantization system 100 in FIG. 1) for quantizing an artificial neural network, according to example embodiments, may obtain an input distribution in layer units and/or channel units of the artificial neural network (e.g., the deep neural network 20). For example, the input distribution IN received by the quantization system 100 of FIG. 1 may be obtained from outputs produced by one layer through a plurality of channels, and may also be obtained from an output corresponding to one channel.

Figure 3:
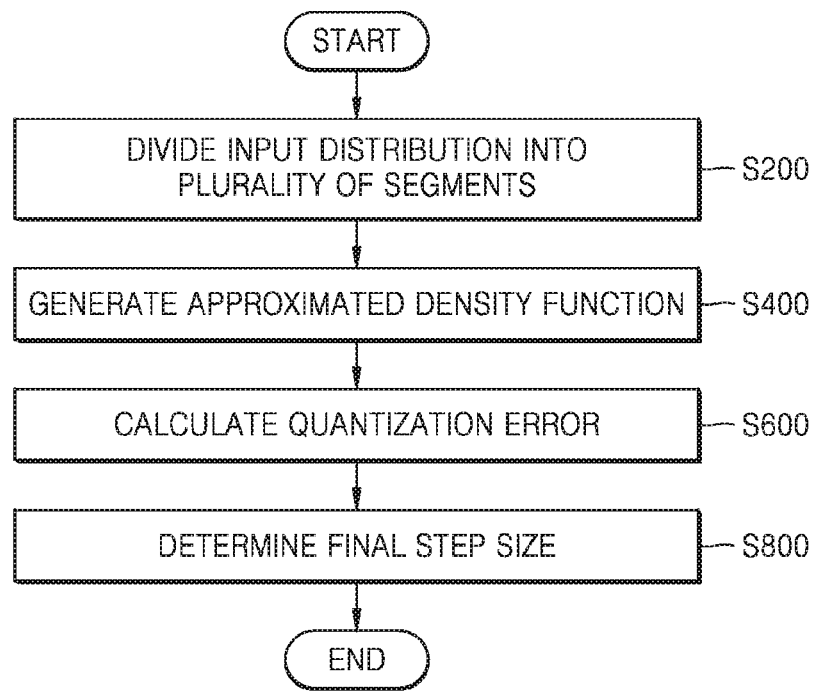
FIG. 3 is a flowchart illustrating a method of quantizing an artificial neural network, according to an example embodiment.

FIG. 3 is a flowchart illustrating a method of quantizing an artificial neural network, according to an example embodiment. For example, the quantization method of FIG. 3 may be performed by the quantization system 100 of FIG. 1. Hereinafter, FIG. 3 will be described with reference to FIG. 1.

Referring to FIG. 3, in operation S200, an operation of dividing the input distribution IN into a plurality of segments may be performed. For example, the approximator 120 may divide the input distribution IN into two or more segments. In some embodiments, the approximator 120 may divide the input distribution IN based on maximum and minimum values of the input distribution IN. In some embodiments, the approximator 120 may divide the input distribution IN based on input parameters provided from the outside of the quantization system 100. An example of operation S200 will be described later with reference to FIG. 4.

In operation S400, an operation of generating an approximated density function ADF may be performed. For example, the approximator 120 may approximate the segments, obtained by dividing the input distribution IN, independently of one another and may approximate each of the segments based on various manners. In some example embodiments, the approximator 120 may approximate each of the segments according to a polynomial of a given order. Also, the approximator 120 may approximate the segments according to the same manner (e.g., polynomials of the same order), or may approximate the segments according to different manners (e.g., polynomials of different orders). An example of operation S400 will be described later with reference to FIG. 5.

In operation S600, an operation of calculating a quantization error may be performed. For example, the quantizer 140 may calculate a quantization error corresponding to a given step size based on the approximated density function ADF. In some example embodiments, the quantizer 140 may represent a quantization error as a function of a step size, and may calculate a plurality of quantization errors corresponding to a plurality of different step sizes. In some example embodiments, quantization errors may be calculated based on overload distortion and granular distortion. Examples of operation S600 will be described later with reference to FIGS. 7 to 11.

In operation S800, an operation of determining a final step size may be performed. For example, the quantizer 140 may determine a step size corresponding to a minimum quantization error. In some embodiments, the quantizer 140 may select one of a plurality of quantization errors corresponding to a plurality of step sizes. In some embodiments, the quantizer 140 may determine a step size based on characteristics of a quantization error represented as a function of the step size.

Figure 4:
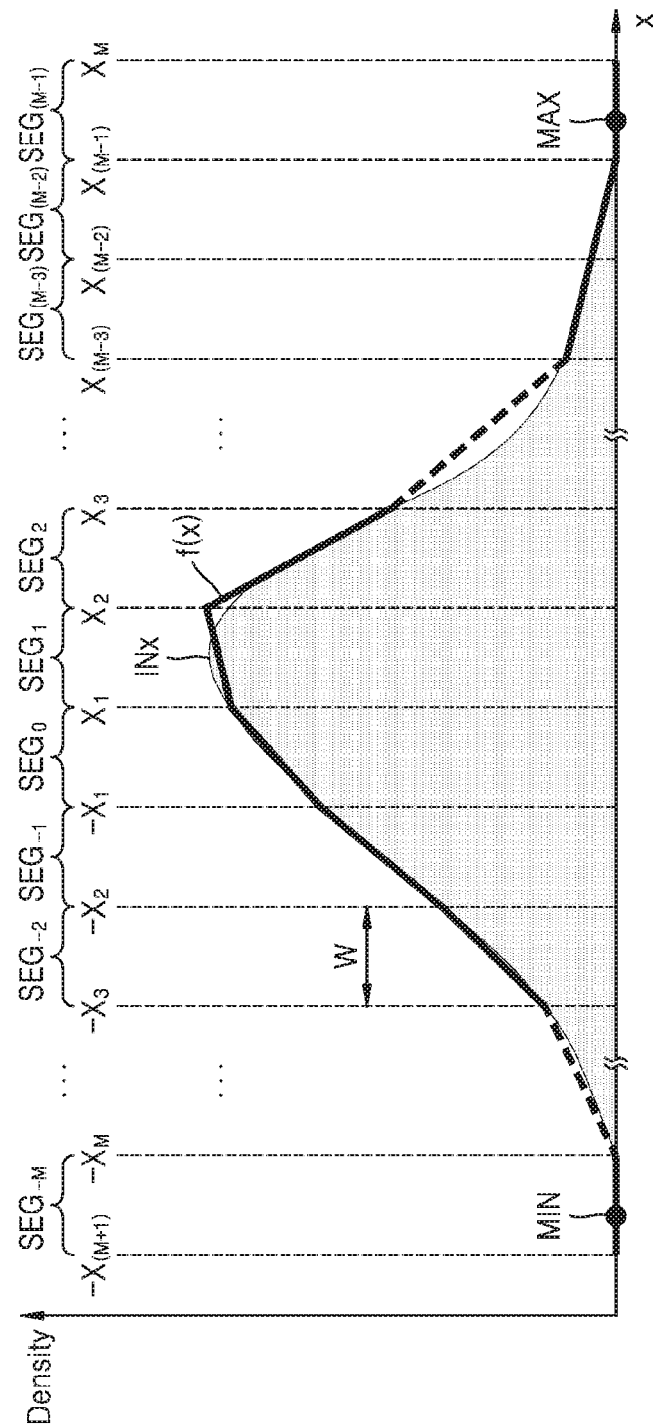
FIG. 4 is a diagram illustrating an operation of approximating an input distribution, according to an example embodiment.

FIG. 4 is a diagram illustrating an operation of approximating the input distribution IN, according to an example embodiment. For example, FIG. 4 illustrates an example of the operation in which the input distribution IN is processed in operations S200 and S400 of FIG. 3. Although FIG. 4 illustrates an example in which the input distribution IN is divided into an even number of segments, it will be understood that the input distribution IN may be divided into an odd number of segments.

Referring to FIG. 4, an input distribution INx may have a maximum value MAX and a minimum value MIN and may have any density at values between the maximum value MAX and the minimum value MIN. As described above, to approximate the input distribution INx, the input distribution INx may be divided into 2M segments $SEG_{-M}$ . . . , and $SEG_{(M-1)}$ when M is an integer greater than or equal to 1. As shown in FIG. 4, a section including the maximum value MAX and the minimum value MIN of the input distribution INx may be divided into the 2M segments $SEG_{-M}$ . . . , and $SEG_{(M-1)}$ having the same width W. For example, the input distribution INx may be divided into the 2M segments $SEG_{-M}$ . . . , and $SEG_{(M-1)}$ in a section $[-X_{(M+1)}, X_M]$ including the maximum value MAX and the minimum value MIN. The segment $SEG_{(M-1)}$ including the maximum value MAX may correspond to a section $[X_{(M-1)}, X_M]$, the segment $SEG_{-M}$ including the minimum value MIN may correspond to a section $[-X_{(M+1)}, -X_M]$, and '$X_M-X_{(M-1)}$' may match '$-X_M-(-X_{(M+1)})$'. In other words, the segment $SEG_{-M}$ and $SEG_{(M-1)}$ may have a uniform width.

In some example embodiments, unlike the example shown in FIG. 4, the input distribution INx may be divided into segments having different widths. For example, the input distribution INx may be divided into segments having a width that is inversely proportional to the density of the input distribution INx. In this manner, as the input distribution INx is divided into the 2M segments $SEG_{-M}$ . . . , and SEG$_{(M-1)}$ and each of the 2M segments SEG$_{-M}$ . . . , and SEG$_{(M-1)}$ is independently approximated, the input distribution INx having an arbitrary form may be approximated to an approximated density function (e.g., the approximated density function ADF in FIG. 1) f(x), and a quantization error may be calculated based on the approximated density function f(x), as described below. Hereinafter, example embodiments will be described with reference to the example of FIG. 4 for convenience of description. However, it will be understood that example embodiments are not limited thereto.

Figure 5:
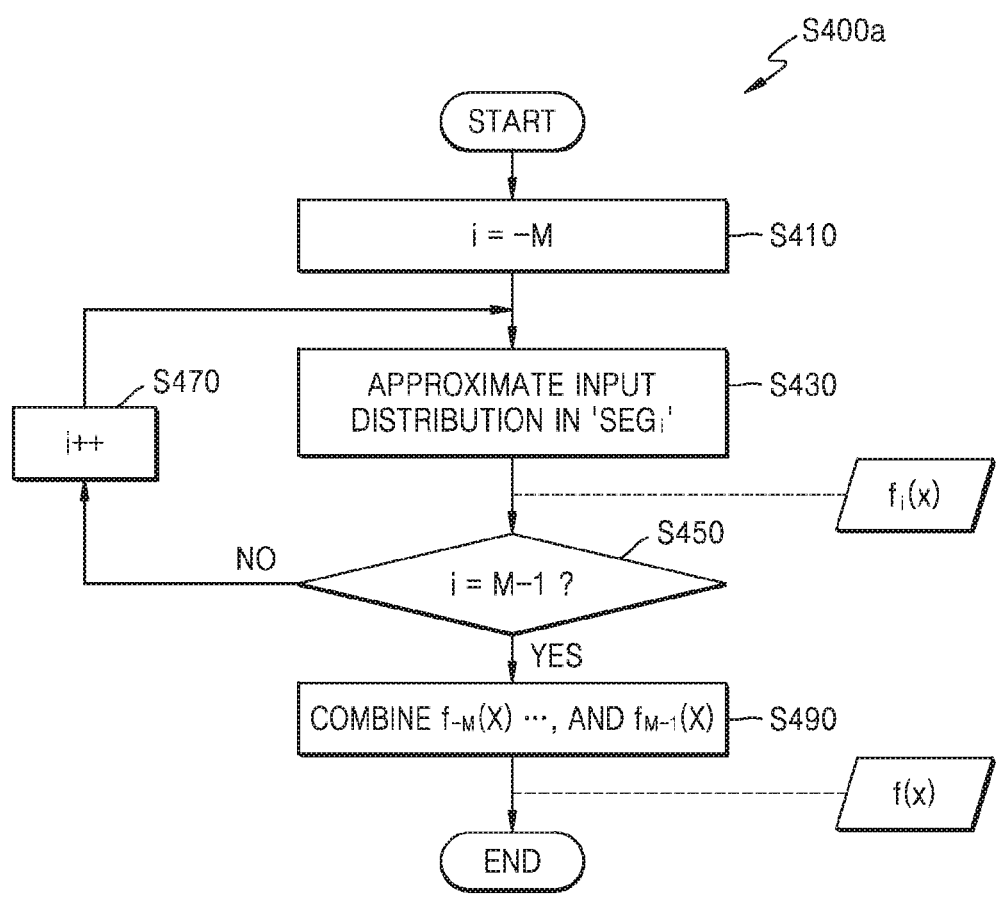
FIG. 5 is a flowchart illustrating an example of operation S400 of FIG. 3, according to an example embodiment.

FIG. 5 is a flowchart illustrating an example of operation S400 of FIG. 3, according to an example embodiment. As described above with reference to FIG. 3, an operation of generating an approximated density function may be performed in operation S400a of FIG. 5. Hereinafter, FIG. 5 will be described with reference to FIG. 4.

Referring to FIG. 5, in operation S410, an operation of initializing a variable may be performed. As shown in FIG. 5, an index i may be set to −M, which is the index of the segment SEG$_{-M}$ corresponding to the minimum value MIN in FIG. 4.

In operation S430, an operation of approximating the input distribution INx in the segment SEG$_i$ may be performed. That is, each of the 2M segments SEG$_{-M}$ . . . , and SEG$_{(M-1)}$ in FIG. 4 may be independently approximated. The segment SEG$_i$ of the input distribution INx may be approximated in various ways. For example, the segment SEG$_i$ may be approximated to a polynomial of a predetermined order (e.g., a positive integer or zero), as a non-limiting example, and a Chebyshev approximation, a Remez algorithm, or the like may be used. In the example of FIG. 4, a case in which each of the 2M segments SEG$_{-M}$ . . . , and SEG$_{(M-1)}$ of the input distribution INx is approximated to a first order polynomial is illustrated. However, it may be understood that example embodiments are not limited thereto. A function f$_i$(x) may be generated by approximating the segment SEG$_i$ of the input distribution INx.

In operation S450, it may be determined whether the index i matches M−1. In other words, it may be determined whether approximation has been completed up to the segment SEG$_{M-1}$ corresponding to the maximum value MAX. When the index i does not match M−1, that is, when there remain segments to be approximated, an operation of incrementing the index i by 1 may be performed in operation S470, and subsequently, an operation of approximating the segment SEG$_i$ may be performed in operation S430. On the other hand, when the index i matches M−1, that is, when the 2M segments SEG$_{-M}$ . . . , and SEG$_{(M-1)}$ of the input distribution INx are approximated to 2M functions f$_{-M(x)}$ . . . , and f$_{M-1}$(x), respectively, operation S490 may be subsequently performed.

In operation S490, an operation of combining the 2M approximated functions f$_{-M}$(x) . . . , and f$_{M-1}$(x) may be performed and an approximated density function f(x) may be generated. For example, the approximated density function f(x) may be defined by Equation 1 below.

$$f(x) = \Sigma_{i=-M}^{M-1} f_i(x) \quad \text{[Equation 1]}$$

The approximated density function f(x) may be continuous or discontinuous at boundaries of segments. In other words, the function f$_i$(x) approximated in operation S430 may have a value, which matches the density of the input distribution INx at boundary values (i.e., x$_i$ and x$_{(x+1)}$) of the segment SEG$_i$, or a value, which is different from the density of the input distribution INx, according to approximation methods. In some embodiments, when the approximated function f$_i$(x) is approximated from the segment SEG$_i$ with a polynomial minimizing Mean Squared Error (MSE), f$_i$(x$_i$) and f$_i$(x$_{(i+1)}$) may have a different value from the input distribution INx and the approximated density function f(x) may be discontinuous. On the other hand, in some example embodiments, the approximated function f$_i$(x) may be approximated to have a value that matches the boundary values of the segment SEG$_i$ and the approximated density function f(x) may be continuous.

In some example embodiments, an operation of normalizing the approximated density function f(x) may be additionally performed. For example, the approximated density function f(x) may be normalized to a probability density function f$_P$(x) that satisfies Equation 2 below, and the probability density function f$_P$(x) may be used to calculate a quantization error as an approximated density function.

$$\int_{-X_{(M+1)}}^{X_M} f_P(x)dx = \int_{X_{(M+1)}}^{X_M} \alpha \cdot f(x)dx = 1 \quad \text{[Equation 2]}$$

FIG. 6 is a flowchart illustrating a method of quantizing an artificial neural network, according to an example embodiment. Compared with the quantization method of FIG. 3, the quantization method of FIG. 6 may include receiving and obtaining an input parameter D61. For example, the quantization method of FIG. 6 may be performed by the quantization system 100 of FIG. 1, and descriptions of FIG. 6 that are the same as those of FIG. 3 will be omitted.

Referring to FIG. 6, in operation S100, an operation of obtaining the input parameter D61 may be performed. For example, the quantization system 100 may receive the input parameter D61 including values associated with quantization from the outside. As shown in FIG. 6, the input parameter D61 may include at least one of the number of segments nSET and the order kTH of a polynomial. A value included in the input parameter D61 may be used in subsequent operations. The input parameter D61 may include only one of the number of segments nSET and the order kTH of a polynomial, and may also further include values other than the number of segments nSET and the order kTH of a polynomial.

In operation S200', an operation of dividing an input distribution IN into a plurality of segments may be performed. For example, the approximator 120 of the quantization system 100 may divide the input distribution IN according to a number of segments nSET included in the input parameter D61.

In operation S400', an operation of generating an approximated density function ADF may be performed. For example, the approximator 120 of the quantization system 100 may approximate each of a plurality of segments to a polynomial of the order kTH according to the order kTH of a polynomial, included in the input parameter D61.

In operation S600', an operation of calculating a quantization error may be performed, and then in operation S800', an operation of determining a step size may be performed.

FIG. 7 is a flowchart illustrating an example of operation S600 of FIG. 3, according to an example embodiment. As described above with reference to FIG. 3, an operation of calculating a quantization error based on an approximated density function ADF may be performed in operation S600a of FIG. 7. Referring to FIG. 7, operation S600a may include a plurality of operations S620, S640, and S660. Hereinafter, FIG. 7 will be described with reference to the example of FIG. 4.

In operation S620, an operation of calculating an overload distortion corresponding to a step size may be performed. The overload distortion may denote an error due to an input that steps out of a limited area when quantization is performed on input in the limited area. When quantization is performed, according to N quantization levels and a step size $\Delta$ in a section $[-L, L)$, on the approximated density function f(x) in FIG. 4, a relationship represented by the equation $L=N\Delta/2$ may be established. In addition, when the size of one step is $S_i=[x_{q,i}-(\Delta/2), x_{q,i}+(\Delta/2))$, then $[-L, L)= S_1 \cup S_2 \cup \ldots \cup S_N$ may be established, and in this case, an overload distortion $D^{over}(\Delta)$ may be defined by Equation 3 below.

$$D^{over}(\Delta)=\int_L^\infty (x-x_{q,N})^2 f(x)dx + \int_{-\infty}^{-L}(x-(x_{q,1}))^2 f(x)dx \quad \text{[Equation 3]}$$

In operation S640, an operation of calculating a granular distortion corresponding to the step size may be performed. A spacing between quantization results within a limited region of an input may be referred to as granularity, and the granular distortion may denote an error due to the spacing. Under the same condition as a condition for defining the overload distortion $D^{over}(\Delta)$, a granular distortion $D^{gran}(\Delta)$ may be defined by Equation 4 below.

$$D^{gran}(\Delta)=\Sigma_{i=1}^N \int (x-x_{q,i})^2 f(x)dx \quad \text{[Equation 4]}$$

In operation S660, an operation of adding the overload distortion and the granular distortion may be performed. That is, a quantization error $D(\Delta)$ may be calculated via Equation 5.

$$D(\Delta)=D^{over}(\Delta)+D^{gran}(\Delta) \quad \text{[Equation 5]}$$

According to Equation 3, Equation 4, and Equation 5, the quantization error $D(\Delta)$ may be expressed as a function of the step size.

Figure 8:
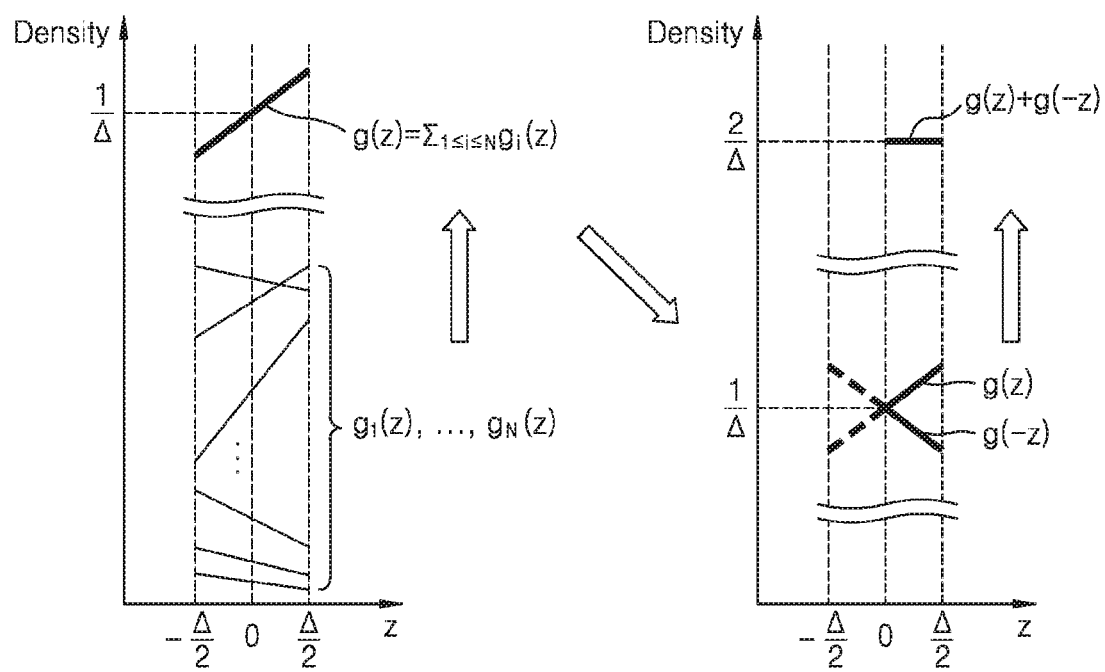
FIG. 8 is a diagram illustrating an example of an operation of calculating a quantization error, according to an example embodiment.

FIG. 8 is a diagram illustrating an example of an operation of calculating a quantization error, according to an example embodiment. Specifically, FIG. 8 illustrates an example of calculating the granular distortion $D^{gran}(\Delta)$, and in this case, it is assumed that a width W and a step size $\Delta$ of each of the 2M segments $SEG_{-M} \ldots$, and $SEG_{(M-1)}$ in FIG. 4 matches each other (that is, N=2M) and the approximated density function f(x) includes functions in which each of the 2M segments $SEG_{-M} \ldots$, and $SEG_{(M-1)}$ is approximated to a first order polynomial. In addition, it is assumed that the approximated density function f(x) is normalized to $f_P(x)$ via Equation 2.

Referring to FIG. 8, as 2M functions $f_{-M}(x) \ldots$, and $f_{M-1}(x)$ to which the 2M segments $SEG_{-M} \ldots$, and $SEG_{(M-1)}$ are approximated are converted into 2M functions $g_{-M}(z) \ldots$, and $g_{(M-1)}(z)$ via Equation 6, the approximated density function f(x) may be converted into a function g(z) having a valid value in a section $[-\Delta/2, \Delta/2)$.

$$g(z)=\Sigma_{i=1}^N g_i(z)=\Sigma_{i=1}^N f_i(x_{q,i}) \quad \text{[Equation 6]}$$

As shown in a left lower portion of FIG. 8, N functions $g_1(z) \ldots$, and $g_N(z)$ may have valid values in the section $[-\Delta/2, \Delta/2)$. As shown in a left upper portion of FIG. 8, a function g(z) obtained by adding the N functions $g_1(z) \ldots$, and $g_N(z)$ may also have a valid value in the section $[-\Delta/2, \Delta/2)$. Since each of the N functions $g_1(z) \ldots$, and $g_N(z)$ is a first order polynomial, the function g(z) may also be a first order polynomial. Accordingly, the function g(z) may be represented by a straight line having a constant slope in the section $[-\Delta/2, \Delta/2)$. Also, since the approximated density function f(x) is normalized, the function g(z) may have a value of $1/\Delta$ at $z=0$ (that is, $g(0)=1/\Delta$).

As the approximated density function f(x) is converted into the function g(z) having a valid value in the section $[-\Delta/2, \Delta/2)$, the granular distortion $D^{gran}(\Delta)$ may be defined via Equation 7.

$$D^{gran}(\Delta) = \sum_{i=1}^{N} \int_{S_i} (x - x_{q,i})^2 f(x)dx = \int_{-\frac{\Delta}{2}}^{+\frac{\Delta}{2}} z^2 \cdot g(z)dz \quad \text{[Equation 7]}$$

As shown in a right portion of FIG. 8, when the function g(z) is integrated in a section $[0, \Delta/2)$, the granular distortion $D^{gran}(\Delta)$ may be defined via Equation 8 below and may be represented as a simplified function of the step size $\Delta$.

$$D^{gran}(\Delta) = \int_0^{+\frac{\Delta}{2}} z^2 \cdot (g(z)+g(-z))dz = \frac{2}{\Delta}\int_0^{+\frac{\Delta}{2}} z^2 dz = \frac{\Delta^2}{12} \quad \text{[Equation 8]}$$

Figure 9:
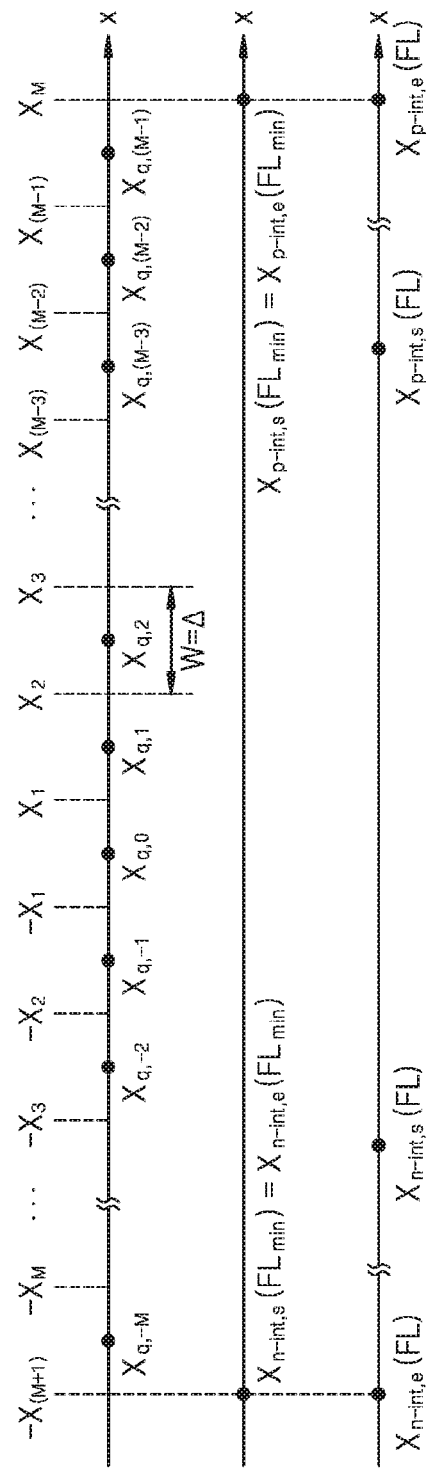
FIG. 9 is a diagram illustrating an example of an operation of calculating a quantization error, according to an example embodiment.

FIG. 9 is a diagram illustrating an example of an operation of calculating a quantization error, according to an example embodiment. Specifically, FIG. 9 illustrates an example of calculating an overload distortion $D^{over}(\Delta)$ under the same condition as the example of FIG. 8.

In a fixed-point neural network, the step size $\Delta$ may be related to a fractional length FL. For example, when the step size $\Delta$ is a power of 2 (e.g., $\Delta=2^{-k}$, where k is a positive integer), the fractional length FL and the step size $\Delta$ may satisfy the relationship shown in Equation 9 below.

$$\Delta=2^{-FL} \quad \text{[Equation 9]}$$

In other words, determining the step size $\Delta$ may correspond to determining the fractional length FL, and a quantization error $D(\Delta)$ may also be represented as a function D(FL) of the fractional length FL. Hereinafter, it is assumed that the step size $\Delta$ and the fractional length FL satisfy the relationship of Equation 9.

Referring to FIG. 9, an overload distortion $D^{over}(FL)$ may be calculated via Equation 10 below.

$$D^{over}(FL) = \int_{X_{p-int,s}(FL)}^{X_{p-int,e}(FL)} (x - x_{q,(M-1)})^2 f(x)dx + \int_{X_{n-int,e}(FL)}^{X_{n-int,s}(FL)} (x - (-x_{q,(-M)}))^2 f(x)dx, \quad \text{[Equation 10]}$$

where $X_{p-int,e}(FL) =$ $X_{p-int,e}(FL_{min}) = X_{q,M} - \frac{\Delta}{2} = 2^{-FL_{min}} 2^{BW-1} - 2^{-FL_{min}-1}$, $X_{p-int,s}(FL) = 2^{-FL}(2^{BW-1} - 1) + 2^{-FL-1}$, $X_{n-int,e}(FL) = X_{n-int,e}(FL_{min}) =$ $-X_{q,M} - \frac{\Delta}{2} = -2^{-FL_{min}} 2^{BW-1} - 2^{-FL_{min}-1}$, and $X_{n-int,s}(FL) = -2^{-FL} 2^{BW-1} - 2^{-FL-1}$.

In Equation 10, $FL_{min}$ denotes a fractional length that prevents the maximum value MAX from being saturated. When a signed bit width of a fixed-point neural network is BW, $FL_{min}$ may be defined via Equation 11.

$$FL_{min}=BW-1-\text{ceil}(\log_2 \max(\text{abs}(x))) \quad \text{[Equation 11]}$$

Figure 10:
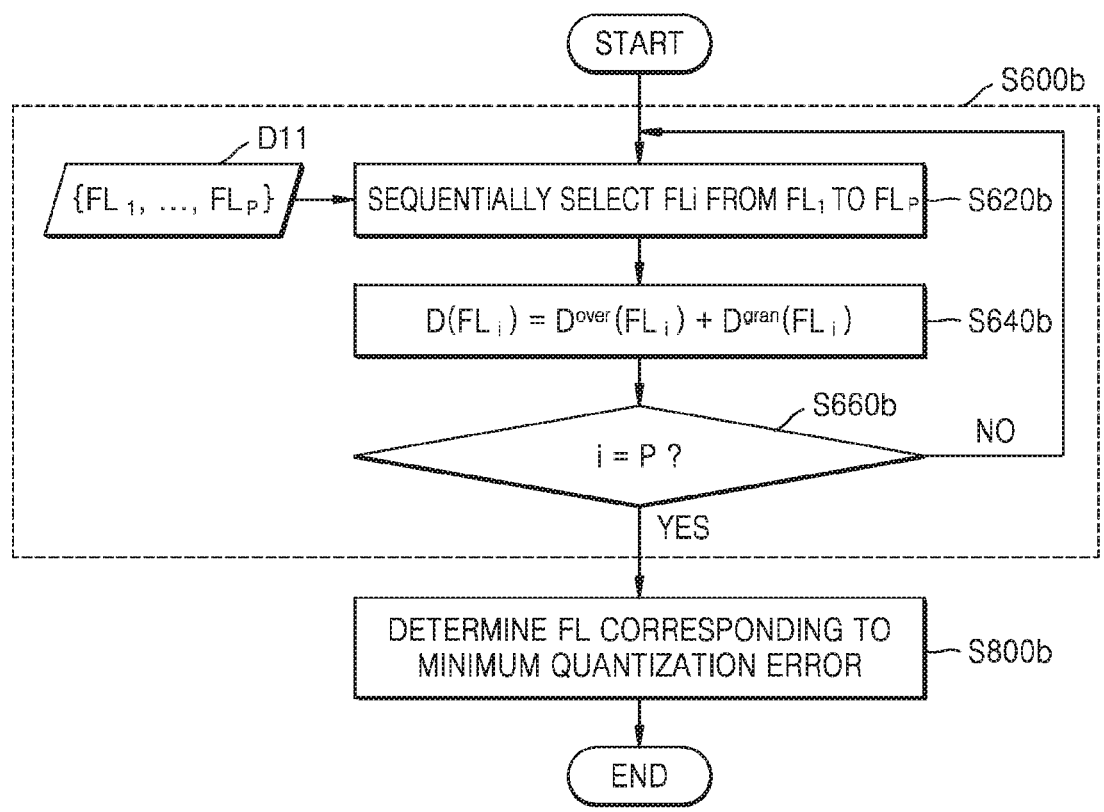
FIGS. 10 and 11 are flowcharts illustrating examples of operations S600 and S800 of FIG. 3, according to example embodiments.
Figure 11:
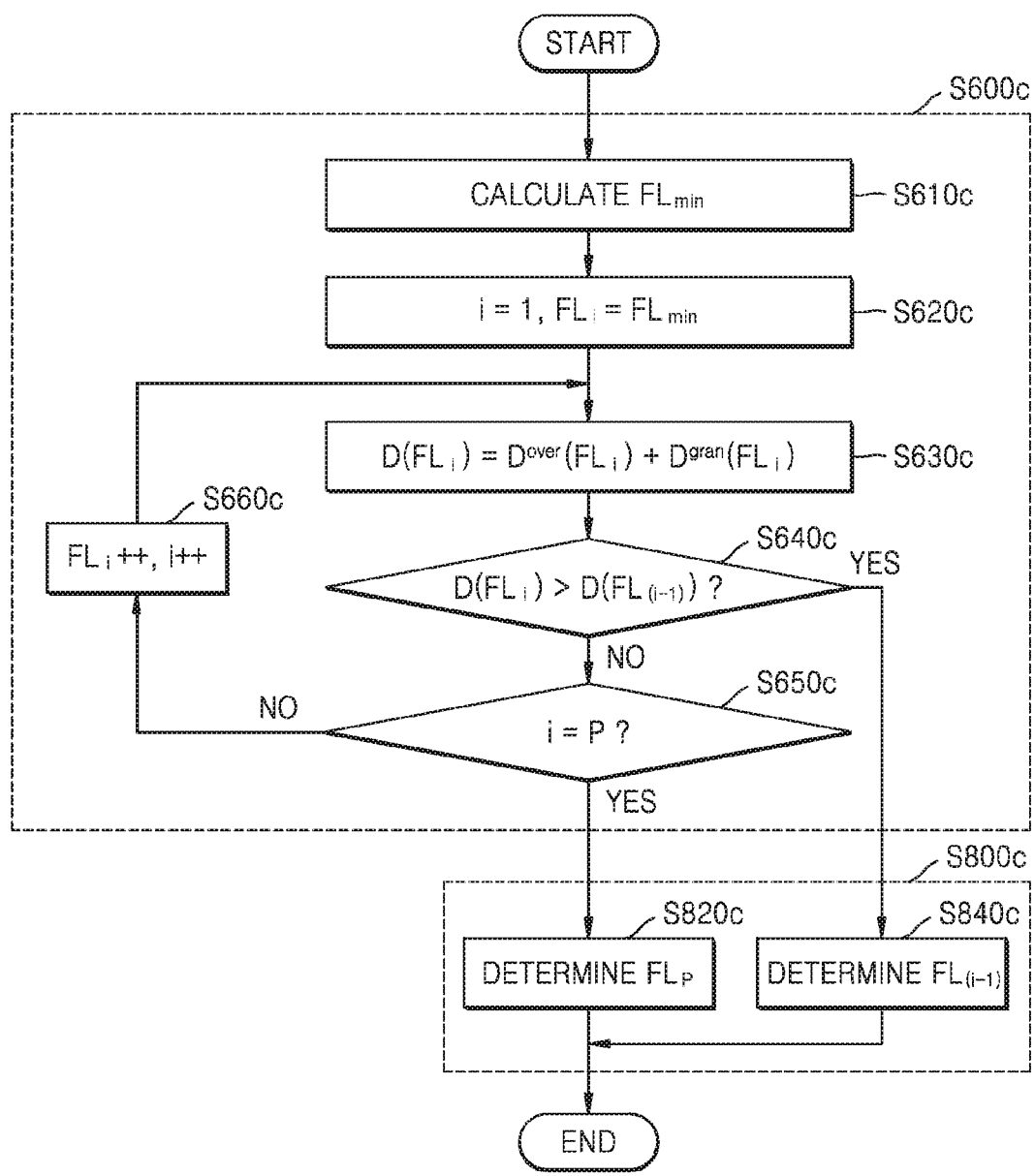

FIGS. 10 and 11 are flowcharts illustrating examples of operations S600 and S800 of FIG. 3, according to example embodiments. As described above with reference to FIG. 3, an operation of calculating a quantization error may be performed in operation S600b of FIG. 10 and operation S600c of FIG. 11, and an operation of determining a step size may be performed in operation S800b of FIG. 10 and operation S800c of FIG. 11. As described above with reference to FIG. 9, determining the step size corresponds to determining a fractional length FL, and thus, the examples of FIGS. 10 and 11 will be described based on the fractional length FL.

Referring to FIG. 10, in some example embodiments, the fractional length FL may be determined using an FL set D11 including a plurality of fractional lengths $FL_1$ to $FL_P$. In some embodiments, the FL set D11 may be determined by a range determined based on a bit width BW of a fixed-point neural network. As shown in FIG. 10, operation S600b of calculating a quantization error may include a plurality of operations S620b, S640b, and S660b, and operation S800b may be performed subsequent to operation S600b.

In operation S620b, an operation of sequentially selecting a fractional length $FL_i$ from a first fractional length $FL_1$ to a fractional length $FL_P$ in the FL set D11 may be performed. In other words, to calculate quantization errors respectively corresponding to the plurality of fractional lengths $FL_1$ to $FL_P$ included in the FL set D11, the plurality of fractional lengths $FL_1$ to $FL_P$ may be sequentially selected.

In some example embodiments, the FL set D11 may include a plurality of fractional lengths $FL_1$ to $FL_P$ arranged in an ascending order (e.g., an order of incrementing by 1), and accordingly, a fractional length having a higher index may be greater than a fractional length having a lower index. In some example embodiments, the FL set D11 may include a plurality of fractional lengths $FL_1$ to $FL_P$ arranged in a descending order (e.g., an order of decrementing by 1), and accordingly, a fractional length having a higher index may be less than a fractional length having a lower index. In some example embodiments, the FL set D11 may include a plurality of fractional lengths $FL_1$ to $FL_P$ arranged in any order.

In operation S640b, an operation of calculating a quantization error $D(FL_i)$ may be performed. For example, as shown in FIG. 10, an overload distortion $D^{over}(FL_i)$ and a granular distortion $D^{gran}(FL_i)$ according to the fractional length $FL_i$ may be respectively calculated and a quantization error $D(FL_1)$ may be calculated as the sum of the overload distortion $D^{over}(FL_i)$ and the granular distortion $D^{gran}(FL_i)$. In some example embodiments, the overload distortion $D^{over}(FL_i)$ and the granular distortion $D^{gran}(FL_i)$ may be calculated according to the above-described equations. As a result, due to the approximated density function f(x) generated in operation S400 of FIG. 3, a quantization error according to the fractional length $FL_i$ may be accurately and easily calculated.

In operation S660b, an operation of determining whether an index i matches the number of elements P in the FL set D11 may be performed. In other words, an operation of determining whether the calculation of quantization errors $D(FL_1)$ to $D(FL_P)$ respectively corresponding to the fractional lengths $FL_1$ to $FL_P$ of the FL set D11 is completed may be performed. When the index i does not match the number of elements P of the FL set D11, a fractional length $FL_i$ according to an index i changed in operation S620b may be selected. Otherwise, operation S800b may be subsequently performed.

In operation S800b, an operation of determining a fractional length FL corresponding to a minimum quantization error may be performed. Accordingly, a determined fractional length FL (or step size) may correspond to a fractional length that substantially minimizes a quantization error, and consequently the quantization of an artificial neural network may provide high accuracy.

Referring to FIG. 11, in some example embodiments, the fractional length may be determined based on characteristics of a quantization error that is a function of the fractional length FL. For example, the quantization error, which is a function of the fractional length FL, may have a gradually increasing form or a convex-downward form in fractional lengths increasing from the fractional length $FL_{min}$ defined by Equation 11. In other words, when a quantization error greater than a previously calculated quantization error occurs in a process of calculating quantization errors for fractional lengths sequentially increasing from the fractional length $FL_{min}$ of Equation 11, the calculation of a quantization error for additional fractional lengths may be stopped. As shown in FIG. 11, operation S600c of calculating a quantization error may include a plurality of operations S610c, S620c, S630c, S640c, S650c, and S660c, and operation S800c including operations S820c and S840c may be performed subsequent to operation S600c.

In operation S610c, an operation of calculating the fractional length $FL_{min}$ may be performed. For example, as described above with reference to FIG. 9, $FL_{min}$ may denote a fractional length that prevents the maximum value MAX from being saturated, and the fractional length $FL_{min}$ may be calculated according to Equation 11.

In operation S620c, an operation of initializing variables may be performed. For example, as shown in FIG. 11, an index i may be set to 1 and a fractional length $FL_i$ may be set to $FL_{min}$ calculated in operation S610c.

In operation S630c, an operation of calculating a quantization error $D(FL_i)$ may be performed. For example, as shown in FIG. 11, an overload distortion $D^{over}(FL_i)$ and a granular distortion $D^{gran}(FL_i)$ according to the fractional length $FL_i$ may be calculated and a quantization error $D(FL_i)$ may be calculated as the sum of the overload distortion $D^{over}(FL_i)$ and the granular distortion $D^{gran}(FL_i)$. In some example embodiments, the overload distortion $D^{over}(FL_i)$ and the granular distortion $D^{gran}(FL_i)$ may be calculated according to the above-described equations.

In operation S640c, an operation of comparing the currently calculated quantization error $D(FL_i)$ to a previously calculated quantization error $D(FL_{(i-1)})$ may be performed. In other words, an operation of comparing the quantization error $D(FL_i)$ of the fractional length $FL_i$ having the index i to the quantization error $D(FL_{(i-1)})$ of a fractional length $FL_{(i-1)}$ having a previous index i−1 may be performed. When the currently calculated quantization error $D(FL_i)$ is greater than the previously calculated quantization error $D(FL_{(i-1)})$, the fractional length $FL_{(i-1)}$ used in the calculation of the previous quantization error $D(FL_{(i-1)})$ may be determined in operation S840c, while if not, operation S650c may be subsequently performed.

In operation S650c, an operation of comparing the index i to a predetermined number P may be performed. The predetermined number P may be any positive integer and may be less than a bit width of a fixed-point neural network. When the index i and the predetermined number P match each other, that is, when quantization errors corresponding to P different fractional lengths consecutively decrease, an operation of determining a final fractional length $FL_P$ may be performed in operation S820c. On the other hand, when the index i and the predetermined number P do not match each other, the fractional length $FL_i$ and the index i may be incremented by 1 in operation S660c, and operation S630c may be subsequently performed.

Figure 12:
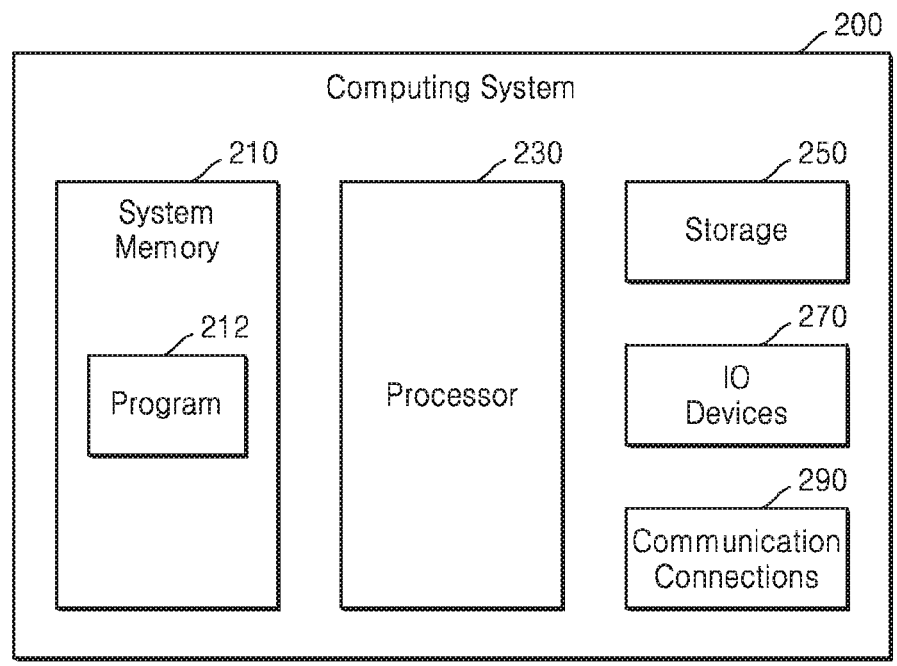
FIG. 12 is a block diagram of a computing system according to an example embodiment.

FIG. 12 is a block diagram of a computing system 200 according to an example embodiment. In some example embodiments, the quantization system 100 of FIG. 1 may be implemented with the computing system 200 of FIG. 12. As shown in FIG. 12, the computing system 200 may include a system memory 210, a processor 230, a storage 250, input/output (I/O) devices 270, and communication connections 290. The components of the computing system 200 may be interconnected, e.g., via a bus.

The system memory 210 may include a program 212. The program 212 may cause the processor 230 to perform quantization of an artificial neural network according to example embodiments. For example, the program 212 may include a plurality of instructions executable by the processor 230, and quantization of an artificial neural network may be performed as the plurality of instructions of the program 212 are executed by the processor 230. As a non-limiting example, the system memory 210 may include a volatile memory such as static random access memory (SRAM) and dynamic random access memory (DRAM), or may include a non-volatile memory such as a flash memory.

The processor 230 may include at least one core capable of executing any instruction set (e.g., Intel Architecture-32 (IA-32), 64-bit extension IA-32, x86-64, PowerPC, Sparc, MIPS, ARM, and IA-64). The processor 230 may execute instructions stored in system memory 210 and may perform quantization of an artificial neural network by executing the program 212.

The storage 250 may retain stored data even if power supplied to the computing system 200 is cut off. For example, the storage 250 may include a non-volatile memory such as electrically erasable read-only memory (EEPROM), a flash memory, phase change random access memory (PRAM), resistance random access memory (RRAM), nano floating gate memory (NFGM), polymer random access memory (PoRAM), magnetic random access memory (MRAM), or ferroelectric random access memory (FRAM), or may include a storage medium such as a magnetic tape, an optical disc, or a magnetic disk. In some example embodiments, the storage 250 may be detachable from the computing system 200.

In some example embodiments, the storage 250 may store a program 212 for quantization of an artificial neural network according to an example embodiment, and the program 212 or at least a portion thereof from the storage 250 may be loaded into the system memory 210 before the program 212 is executed by the processor 230. In some example embodiments, the storage 250 may store a file written in a programming language, and a program 212 or at least a portion thereof generated by a compiler or the like from the file may be loaded into the system memory 210.

In some example embodiments, the storage 250 may store data to be processed by the processor 230 and/or data processed by the processor 230. For example, the storage 250 may store data corresponding to the input distribution IN of FIG. 1 and/or the input parameter D61 of FIG. 6, may store data corresponding to the quantized output OUT of FIG. 1, and may store data generated during quantization, for example, a step size and a fractional length.

The I/O devices 270 may include an input device such as a keyboard and a pointing device (e.g., a mouse, a touchpad, etc.), and may include an output device such as a display device and a printer. For example, a user may trigger the execution of the program 212 by the processor 230 via the I/O devices 270, may input the input parameter D61 of FIG. 6, and may check the quantized output OUT of FIG. 1 and/or an error message.

The communications connections 290 (e.g., a communications interface, a network adapter, an antenna, etc.) may provide access to a network outside the computing system 200. For example, the network may include multiple computing systems and communication links, and the communication links may include wired links, optical links, wireless links, or any other type of links.

Figure 13:
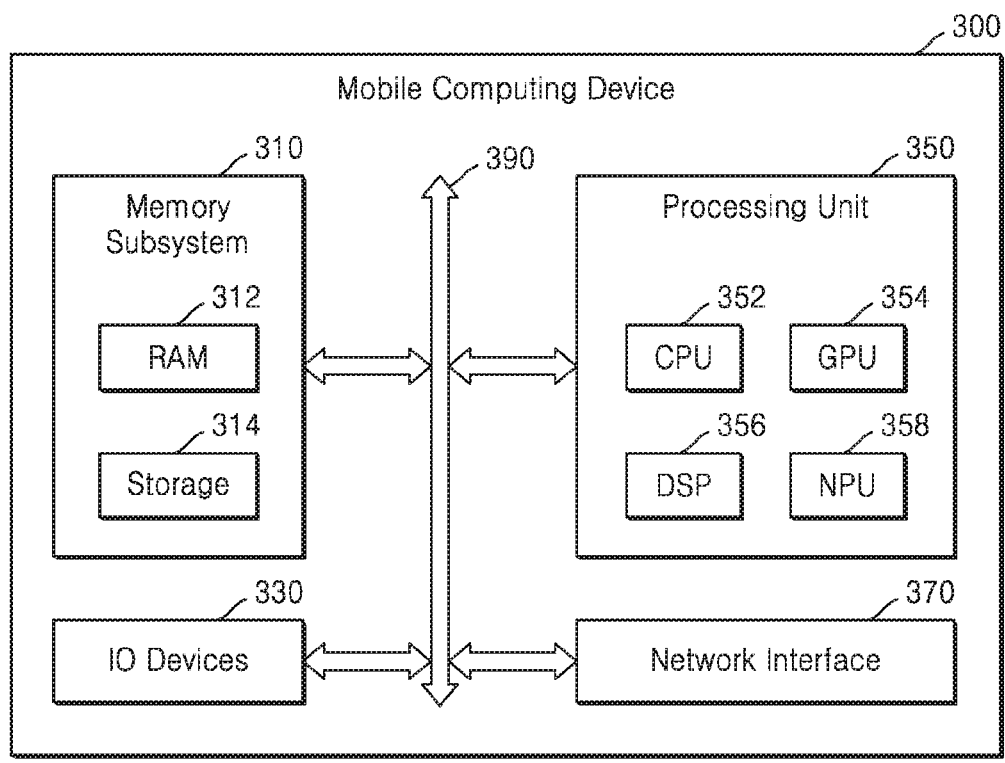
FIG. 13 is a block diagram of a mobile computing device according to an example embodiment.

FIG. 13 is a block diagram of a mobile computing device 300 according to an example embodiment. In some example embodiments, a fixed-point neural network quantized according to an example embodiment may be implemented in the mobile computing device 300. As a non-limiting example, the mobile computing device 300 may be any of mobile electronic devices, such as a mobile phone, a tablet personal computer (PC), a wearable device, and/or an object Internet device (e.g., an Internet-of-things device), which are powered by battery or self-power generation.

As shown in FIG. 13, the mobile computing device 300 may include a memory subsystem 310, input/output (I/O) devices 330, a processing unit 350, and a network interface 370. The memory subsystem 310, the I/O devices 330, the processing unit 350, and the network interface may communicate with each other via a bus 390. In some example embodiments, at least two of the memory subsystem 310, the I/O devices 330, the processing unit 350, and the network interface may be included in one package as a System-on-Chip (SoC).

The memory subsystem 310 may include an RAM 312 and a storage 314. The RAM 312 and/or the storage 314 may store instructions that are executed by the processing unit 350, and data that are processed by the processing unit 350. For example, the RAM 312 and/or the storage 314 may store variables such as signals, weights, and biases of an artificial neural network and may also store parameters of an artificial neuron (or computational node) of an artificial neural network. In some example embodiments, the storage 314 may include a non-volatile memory.

The processing unit 350 may include a central processing unit (CPU) 352, a graphics processing unit (GPU) 354, a digital signal processor (DSP) 356, and a neural processing unit (NPU) 358. Unlike in FIG. 13, in some example embodiments, the processing unit 350 may include only some of the CPU 352, the GPU 354, the DSP 356, and the NPU 358.

The CPU 352 may control the overall operation of the mobile computing device 300. For example, the CPU 352 may directly perform a specific task in response to an external input received through the I/O devices 330, or may direct other components of the processing unit 350 to perform a task. The GPU 354 may generate data for an image output through a display device in the I/O devices 330 and may encode data received from a camera in the I/O devices 330. The DSP 356 may generate useful data by processing a digital signal, e.g., a digital signal provided from the network interface 370.

The NPU 358, which is dedicated hardware for an artificial neural network, may include a plurality of computational nodes corresponding to at least some artificial neurons that constitute the artificial neural network, and at least some of the plurality of computational nodes may process a signal in parallel. An artificial neural network quantized according to an example embodiment, for example, a deep neural network, has low computational complexity as well as high accuracy, and thus may be easily implemented in the mobile computing device 300 of FIG. 13, have a fast processing speed, and also be implemented by, for example, a simple and small-scale NPU.

The I/O devices 330 may include input devices such as a touch input device, a sound input device, and a camera, and output devices such as a display device and a sound output device. For example, when a user's voice is input through the sound input device, the voice may be recognized by a deep neural network implemented in the mobile computing device 300, and a corresponding operation may be triggered. In addition, when an image is input through the camera, an object in the image may be recognized by the deep neural network implemented in the mobile computing device 300, and an output such as virtual reality may be provided to a user. The network interface 370 may provide access to a mobile communication network, such as Long Term Evolution (LTE) or 5G, for the mobile computing device 300 and may provide access to a local network such as wireless local network (WLAN) through the Wi-Fi protocol.

While the present disclosure has been particularly shown and described with reference to example embodiments thereof, it will be understood that various changes in form and details may be made therein without departing from the spirit and scope of the following claims.

What is claimed is:

1. A method of quantizing an artificial neural network, the method comprising:
   dividing an input distribution of the artificial neural network into a plurality of segments;
   generating an approximated density function by approximating each of the plurality of segments, the input distribution including a distribution of weights included in the artificial neural network;
   determining at least one quantization error corresponding to at least one step size for quantizing the artificial neural network, based on the approximated density function;
   determining a final step size for quantizing the artificial neural network, based on the at least one quantization error; and
   converting, using the final step size, the artificial neural network to a fixed-point neural network, wherein the artificial neural network is a floating-point neural network, and
   wherein the generating the approximated density function comprises:
   approximating the plurality of segments to a plurality of functions independently of one another; and
   generating the approximated density function by combining the plurality of functions.

2. The method of claim 1, wherein the dividing comprises dividing a section including a maximum value and a minimum value of the input distribution into the plurality of segments.

3. The method of claim 1, further comprising obtaining a number of the plurality of segments as an input parameter,
   wherein the dividing comprises dividing the input distribution into the number of the plurality of segments.

4. The method of claim 1, wherein the dividing comprises dividing the input distribution into the plurality of segments having a uniform width.

5. The method of claim 1, wherein the dividing comprises dividing the input distribution so that each segment of the plurality of segments has a width inversely proportional to the input distribution.

6. The method of claim 1, wherein the plurality of functions are a plurality of polynomials, respectively.

7. The method of claim 6, further comprising obtaining an order of a polynomial as an input parameter,
   wherein the approximating comprises approximating the plurality of segments to the plurality of polynomials of the order, respectively.

8. The method of claim 6, wherein the generating the approximated density function further comprises generating the approximated density function as a probability density function by normalizing the plurality of polynomials which have been combined.

9. The method of claim 1, wherein the determining the at least one quantization error comprises determining a sum of an overload distortion and a granular distortion according to the at least one step size.

10. The method of claim 1, further comprising obtaining a fixed-point artificial neural network based on the final step size.

11. The method of claim 10, wherein the determining the at least one quantization error comprises:
    accessing a fractional length (FL) set including a plurality of fractional lengths; and
    sequentially determining quantization errors respectively corresponding to the plurality of fractional lengths from the FL set.

12. The method of claim 11, wherein the determining the at least one quantization error comprises:
    determining a minimum fractional length; and
    sequentially determining the quantization errors for fractional lengths gradually increasing from the minimum fractional length.

13. The method of claim 12, wherein the sequentially determining the quantization errors is stopped in response to a quantization error being greater than a previously determined quantization error.

14. The method of claim 1, further comprising obtaining the input distribution in one of units of layers and channels of the artificial neural network.

15. An apparatus comprising:
    a memory; and
    at least one processor configured to execute computer-executable procedures stored in the memory,
    wherein the computer-executable procedures comprise:
    an approximator configured to generate an approximated density function by approximating each of a plurality of segments divided from an input distribution of an artificial neural network, the input distribution including a distribution of weights included in the artificial neural network,
    a quantizer configured to:
    determine at least one quantization error corresponding to at least one step size for quantizing the artificial neural network based on the approximated density function, and to determine a final step size for quantizing the artificial neural network according to the at least one quantization error, and
    convert, using the final step size, the artificial neural network to a fixed-point neural network, wherein the artificial neural network is a floating-point neural network, and
    wherein the approximator is further configured to:
    approximate the plurality of segments to a plurality of functions independently of one another, and
    generate the approximated density function by combining the plurality of functions.

16. The apparatus of claim 15, wherein the approximator is further configured to receive a number of the plurality of segments as an input parameter and to divide the input distribution into the number of the plurality of segments.

17. The apparatus of claim 15, wherein the approximator is further configured to receive an order of a polynomial as an input parameter and to approximate the plurality of segments to polynomials of the order, respectively.

18. The apparatus of claim 15, wherein the quantizer is further configured to determine a sum of an overload distortion and a granular distortion according to the at least one step size.

19. The apparatus of claim 15, wherein the quantizer is further configured to determine a minimum fractional length, and to sequentially determine quantization errors until a trough is reached, with respect to fractional lengths gradually increasing from the minimum fractional length.

20. A method of quantizing a floating-point neural network, the method comprising:
- dividing an input distribution of the floating-point neural network into a plurality of segments having a uniform width, the input distribution including a distribution of weights included in the floating-point neural network;
- generating an approximated density function by approximating each of the plurality of segments to a polynomial;
- determining at least one quantization error corresponding to at least one fractional length, based on the approximated density function;
- determining a final step size for quantizing the floating-point neural network, based on the at least one quantization error, and
- converting, using the final step size, the floating-point neural network to a fixed-point neural network,
- wherein the generating the approximated density function comprises:
  - approximating the plurality of segments to a plurality of functions independently of one another; and
  - generating the approximated density function by combining the plurality of functions.

* * * * *